(12) United States Patent
Srinivasan et al.

(10) Patent No.: US 9,203,734 B2
(45) Date of Patent: Dec. 1, 2015

(54) OPTIMIZED BI-DIRECTIONAL COMMUNICATION IN AN INFORMATION CENTRIC NETWORK

(71) Applicant: Infosys Limited, Bangalore (IN)

(72) Inventors: Karthik Srinivasan, Bangalore (IN); Rajat Arya, Meerut (IN)

(73) Assignee: Infosys Limited, Bangalore (IN)

( * ) Notice: Subject to any disclaimer, the term of this patent is extended or adjusted under 35 U.S.C. 154(b) by 211 days.

(21) Appl. No.: 13/918,566

(22) Filed: Jun. 14, 2013

(65) Prior Publication Data

US 2013/0336323 A1     Dec. 19, 2013

(30) Foreign Application Priority Data

Jun. 15, 2012   (IN) .......................... 2390/CHE/2012

(51) Int. Cl.
*H04L 9/00* (2006.01)
*H04L 12/701* (2013.01)
*H04L 29/08* (2006.01)

(52) U.S. Cl.
CPC ............... *H04L 45/00* (2013.01); *H04L 67/00* (2013.01); *H04L 67/14* (2013.01)

(58) Field of Classification Search
CPC .. H04L 43/0852; H04L 43/0864; H04L 47/32
USPC .......................................... 370/236, 410, 475
See application file for complete search history.

(56) References Cited

U.S. PATENT DOCUMENTS

| 2002/0080720 | A1* | 6/2002 | Pegrum et al. ................. 370/236 |
| 2007/0127633 | A1* | 6/2007 | Hertel et al. .................. 379/67.1 |
| 2008/0144824 | A1* | 6/2008 | Stewart et al. ................. 380/257 |
| 2009/0157397 | A1* | 6/2009 | Kondo ........................... 704/219 |
| 2009/0285209 | A1  | 11/2009 | Stewart et al. |
| 2009/0287835 | A1  | 11/2009 | Jacobson |
| 2010/0299525 | A1* | 11/2010 | Shah et al. ..................... 713/171 |
| 2011/0002460 | A1* | 1/2011 | Michaels et al. ................. 380/37 |
| 2012/0039469 | A1* | 2/2012 | Mueller et al. ................. 380/252 |
| 2013/0311643 | A1* | 11/2013 | Kulkarni ........................ 709/224 |

* cited by examiner

*Primary Examiner* — Dang Ton
*Assistant Examiner* — Sai Aung
(74) *Attorney, Agent, or Firm* — Klarquist Sparkman, LLP

(57) ABSTRACT

Embodiments describe enhancing bi-directional communication in an information centric computer network through a piggyback session, which comprises mapping requests for data received to content, sending at least one piggyback packet to a remote node, wherein a piggyback packet is a data packet comprising a request field and a content field, receiving at least one piggyback packet from the remote node, and processing the piggyback packets. Processing may comprise splitting the request field and the content field in at least one received piggyback packet, sending the content extracted from the received piggyback packet to a client application running on the computing apparatus and setting one or more events to trigger the processing of at least one piggyback packet. Additional embodiments describe the structure of a piggyback packet and the management of a piggyback session at a router device by validating incoming piggyback packets and determining a recipient accordingly.

35 Claims, 8 Drawing Sheets

OPTIMIZED BI-DIRECTIONAL COMMUNICATION IN AN INFORMATION CENTRIC NETWORK

FIELD

The invention relates generally to optimizing bi-directional communication in a network. In particular, the invention relates to optimizing bi-directional communication in an information centric network by reducing packet traffic quantity and processing time.

BACKGROUND

Internet usage patterns have changed markedly since the advent of high speed data connectivity. Data creation, dissemination and access drive most traffic on the Internet, causing a greater focus on acquiring data as needed regardless of the source of the data. Such evolving usage models have put significant pressure on the prevalent internet infrastructure, much of which was originally designed around a host-centric model. For example, in the present model, to acquire data, consumer systems need to be aware of the source of the desired data. Such data may additionally be difficult to authenticate, as current models do not provide built in mechanisms for verifying data authenticity, which may, in turn, lead to issues such as spamming or phishing.

To address some of these problems, an Information Centric Networking (ICN) approach was developed to re-design the current Internet to move away from the "host-centric" model to a "data-centric" model. ICN seeks to make data the primary design target, rather than its location.

ICN approaches, then, seek to remove many of the issues in the current Internet, particularly in the areas of data delivery, security and mobility. Most, if not all, ICN approaches operate on a pull model, driven by a data receiver. These approaches may seek to define security and mobility as core features of the network, rather than have them as overlays.

However, existing ICN models may be inefficient in the area of bi-directional real-time communications. In classical ICN approaches, each participant sends a request message for any data that they require. The network or the targeted entity then sends back the requested data as a response. However, for real-time bidirectional multi-media communications, this pull-based model introduces significant overheads due to increased traffic and processing of a much larger number of packets at the network elements.

Real Time Communication (RTC) applications, for example, a voice-over-IP (VoIP) call, may require a continuous stream of voice packets, to be exchanged between participating parties for an extended period of time. Delivery of these data may have real-time constraints. Failure to meet these constraints can lead to severe degradation of call quality. In standard VoIP implementations, both parties may stream voice packets to the other side as soon as they receive a signaling confirmation that the other end is ready to receive media. Thus, media exchange occurs in a push model, in contrast to the pull model in ICN approaches.

Using Pull type architecture is problematic for real-time applications due to performance and processing overheads. Some adaptations exist, such as methods for pipelining, where requests are sent in advance to availability of data, thereby reducing latencies that may occur if the parties to the call had to wait for requests from the other end before they can send media. Even with such changes, however, transmitting bi-directional real-time traffic has significant overheads.

Specifically, existing approaches may impose significant network overhead. In an RTC application, like a VoIP conference call, all involved parties send as well as receive data. In VoIP this may be achieved by creating one outgoing real-time transport protocol ("rtp") stream and one incoming rtp stream for each user. In an ICN model, each user may need to send a request for the other parties' data, and send data in response to the other parties' request. Consequently, every data packet to be sent needs a corresponding request packet. In a n-user conference, traditional VoIP will require setting up 2*n rtp streams, while a similar implementation in an existing ICN model may require 4*n streams, effectively reducing available bandwidth to half.

Existing ICN approaches may impose a processing overhead. Most normal processing operations involving the request and data packets in existing ICN models are not necessary for RTC applications. Cache lookups while processing requests and cache updates while forwarding data packets, for example, may be superfluous given that data is transient in real-time communications. Also, the requirement to have a request precede the receipt of any content may result in increased packet processing overhead as they have to process double the number of packets.

Accordingly, there is a need for a data centric approach to bi-directional communications that addresses the above problems.

SUMMARY

Embodiments of the present invention include a computer implemented method for enhanced bi-directional communication in an information centric computer network, the method comprising receiving, by a computing apparatus, one or more requests for data from at least one of a remote node and a client application on the computing apparatus and switching to a piggyback session by the computing apparatus. As disclosed, the piggyback session may comprise mapping the one or more requests for data received to content, sending at least one piggyback packet, by the computing apparatus, to the remote node, wherein a piggyback packet is a data packet comprising a request field and a content field, receiving at least one piggyback packet from the remote node, processing one or more piggyback packets. In accordance with at least one embodiment, the processing may comprise splitting the request field and the content field in at least one received piggyback packet, sending the content extracted from the received piggyback packet to a client application running on the computing apparatus and setting one or more events to trigger the processing of at least one piggyback packet.

In another embodiment, a computer implemented method for enhancing bi-directional communication by a router device in an information centric network is described. In accordance with the described embodiment, the method may comprise validating an incoming packet by the router device, wherein the packet comprises a content field and a request field, checking a processor readable memory at the router device for a stored request entry that matches content in the incoming packet, creating an entry in a processor readable memory at the router device for the embedded request in the packet, determining one or more router interfaces for forwarding data from the incoming packet to a remote client device, determining one or more router interfaces for forwarding a request from the incoming packet to a remote client device, and forwarding the incoming packet to one or more overlapping router interfaces. An overlapping router interface is a determined router interface for forwarding the data from the incoming packet and is also a determined router interface for forwarding a request from an incoming packet. An additional step discloses splitting the incoming packet into a request packet and a data packet if no overlapping router interfaces exist.

In another embodiment, a machine comprising a processor and a processor readable memory which contains data representing a packet data structure is described. The packet data structure may comprise a first field, the first field comprising a content object. The content object includes a content name and an authentication field, wherein the authentication field comprises a set of authentication information selected from a group consisting of a cryptographic key and a cryptographic signature, and, additionally, a data field. The packet data structure also comprises a second field with a request object, wherein the request object includes a request name.

DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for enhanced bi-directional communication in an information centric network are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

Embodiments of the present invention may combine disabling of caching with an intelligent exploitation of the bidirectional nature of the real-time traffic to reduce both computational and network overheads involved in an ICN approach to support real time communications. In accordance with some embodiments, future requests piggy back on data sent in response to requests from the far-end. To accomplish this, present implementations include a 'piggyback packet' which contains both data and request fields in the same packet. By sending a single piggyback packet instead of separate request and data packets, both network and processing overhead may be reduced.

Figure 1:
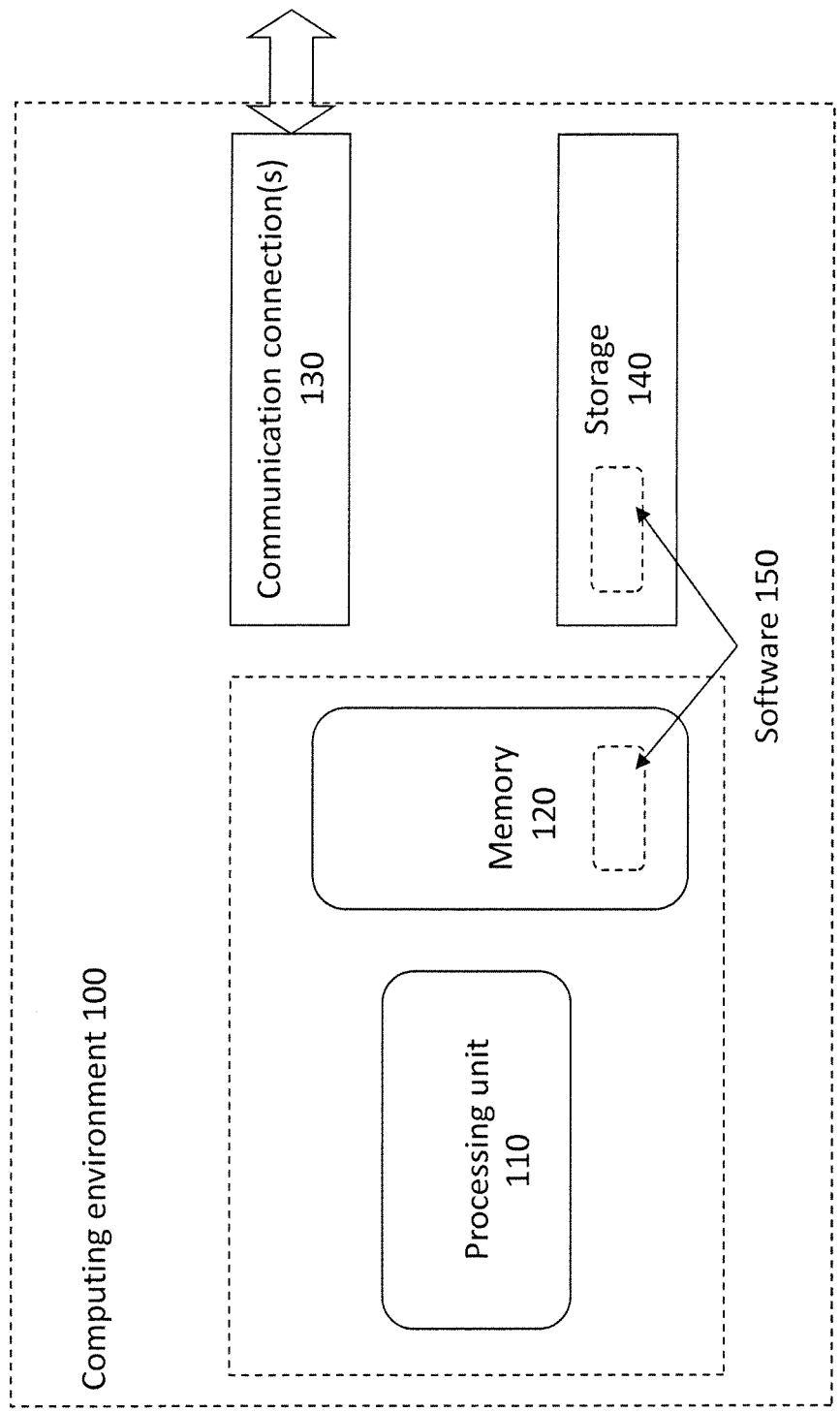
FIG. 1 is an illustration of an exemplary computing architecture involved in the optimization of bi-directional communication, in accordance with an embodiment.

Firstly, with reference to FIG. 1, a computing environment in which present implementations may be executed is described. With reference to FIG. 1, the computing environment 100 includes at least one processing unit 110 and memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. In some embodiments, the memory 120 stores software 150 implementing described techniques.

A computing environment may have additional features. For example, the computing environment 100 includes storage 140, and one or more communication connections 130. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which may be used to store information and which may be accessed within the computing environment 100. In some embodiments, the storage 140 stores instructions for the software 150.

Some embodiments may include one or more input devices and one or more output devices. The input device(s) may be a touch input device such as a keyboard, mouse, pen, trackball, touch screen, or game controller, a voice input device, a scanning device, a digital camera, or another device that provides input to the computing environment 100. The output device(s) may be a display, printer, speaker, or another device that provides output from the computing environment 100.

The communication connection(s) 130 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 100, computer-readable media include memory 120, storage 140, communication media, and combinations of any of the above.

Figure 2:
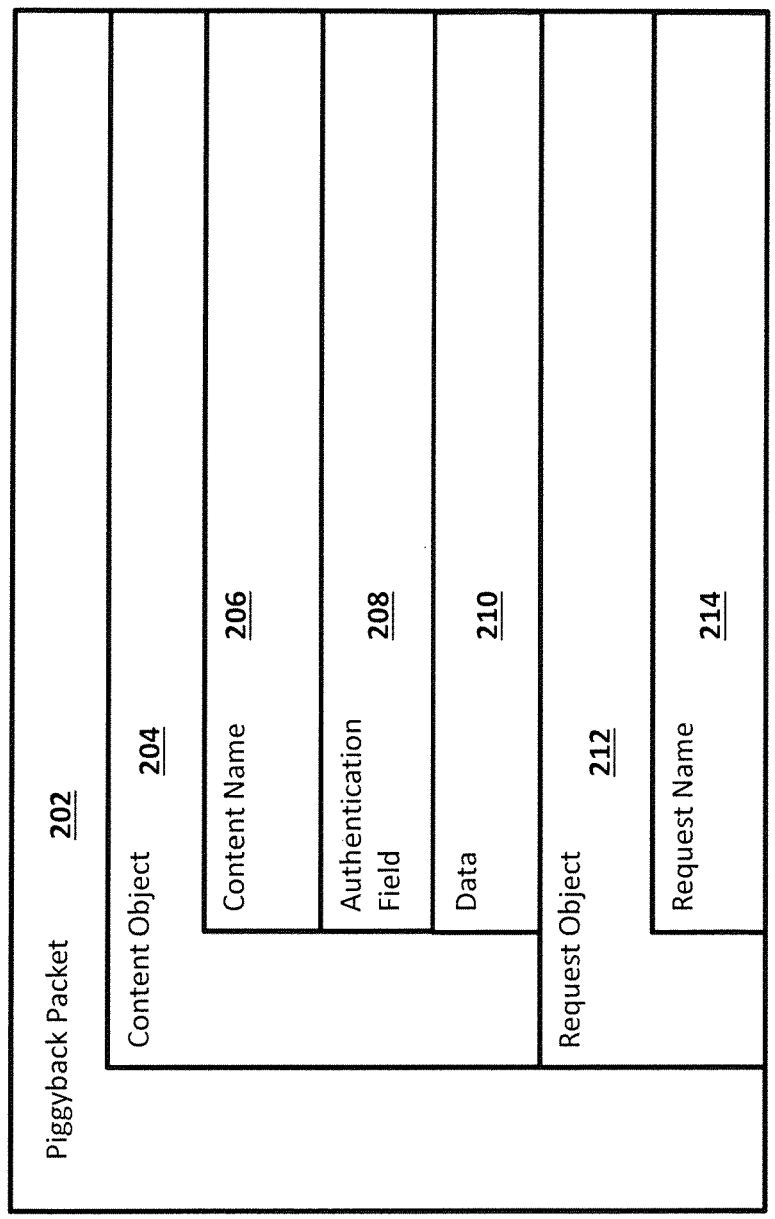
FIG. 2 is an illustrative diagram of a piggyback packet, in accordance with an embodiment.

Preferred embodiments, as mentioned, include a new packet type that enables requests to be piggybacked with data by means of a 'piggyback' packet. More specifically, a piggyback packet may be described with reference to FIG. 2. In bidirectional real-time traffic, each user may both send and receive data. To this end, a piggyback packet may comprise both data and requests. More specifically, a typical piggyback packet is depicted in FIG. 2. The piggyback packet 202 may comprise a content object 204 and a request object 212. The content object 204 of the piggyback packet may additionally include a content name 206 that may identify the nature of the content, as in 204, an authentication field 208 whereby the identity of the sender or publisher is verifiable or, as in some embodiments, whereby the integrity of the packet is verifiable, and the substantive data or information received or intended to be sent, as in 210. The piggyback packet 202 may also contain a request object 212 which contains the name of the request 214. In a piggyback packet, the request object and the content object may be loosely coupled, that is, the content object and the request object may be separable from each other so the piggyback packet may be reconstituted by the receiver node into component data and request packets.

Present embodiments may include processing steps at a client side, that is, at a sender or receiver node communicably coupled with another client that sends or receives one or more piggyback packets over the course of a session. Additional embodiments may include processing steps at a router side, where the router node is involved in the transfer of one or more piggyback packets between the client nodes.

Figure 3:
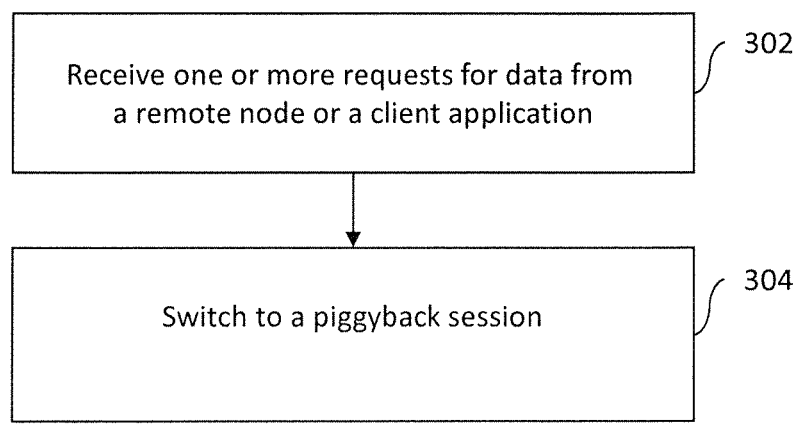
FIG. 3 is a flowchart illustrating aspects of a method for optimizing bi-directional communication, in accordance with an embodiment.

Referring now to FIG. 3, an initial step 302 in an implementation at a client side is the receipt of one or more requests for data from a remote node or client application, where a client application is a software program or process running on the client device that may optionally provide a user interface by means of which a user may initiate or manage communications with a remote client. In an information centric network in which the embodiments disclosed are implemented, a request to access specific data is sent, by the consumer or sender node, as a request packet. A response to the requested data may be transmitted by the receiver node by means of a data packet. Once the communications session has been initiated, as indicated by the receipt of requests in accordance with 302, then, as in a step 304, the client device may switch to a piggyback session.

Figure 7:
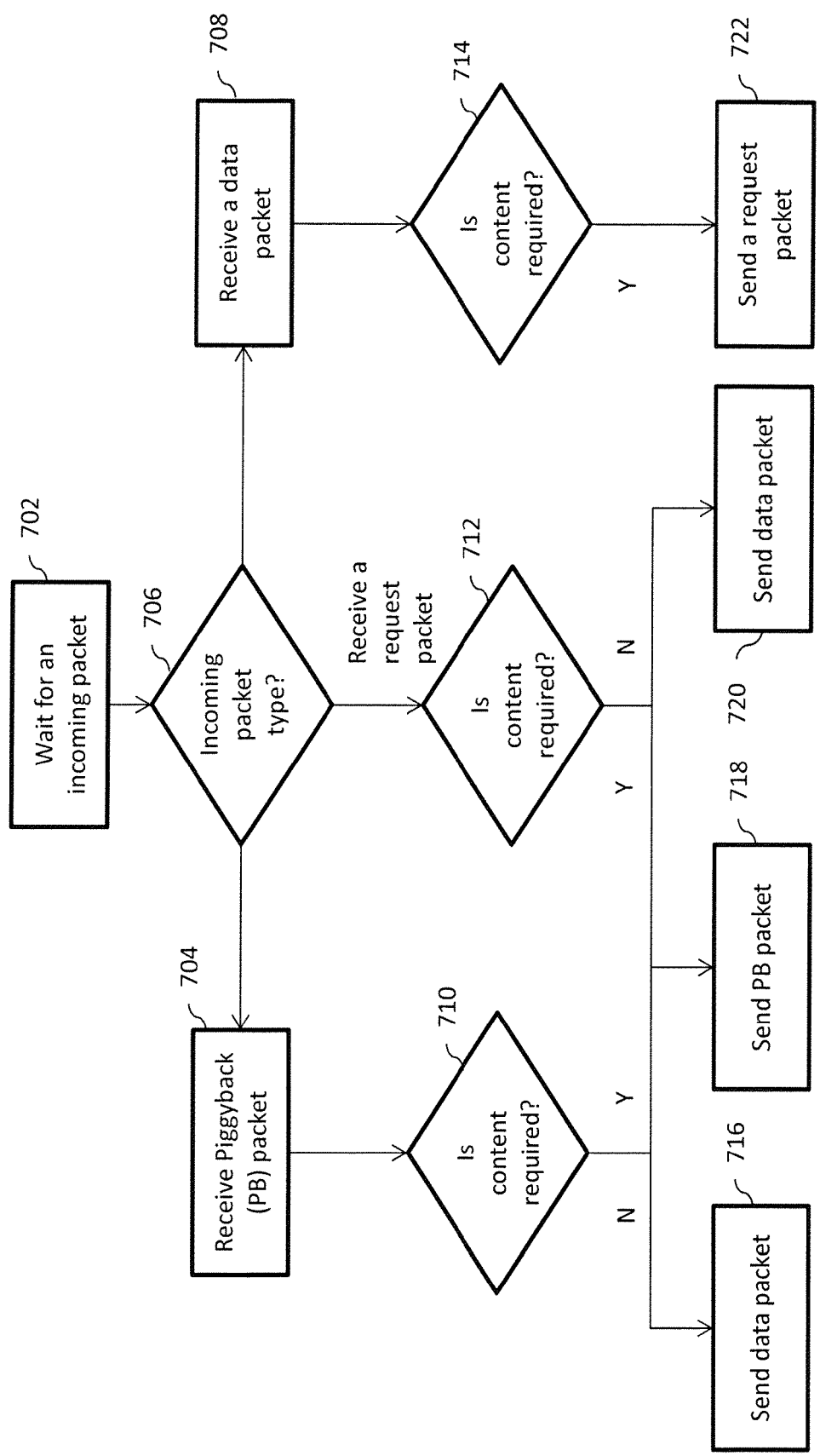
FIG. 7 is a flow diagram illustrating responses, by a client stack, to different packet reception events in a piggyback session in accordance with an embodiment.

More specifically, the initiation of a piggyback session may be preceded by the exchange of request packets by participants in the communications session. Each participant, where a participant is a client device running a client application connected to the network, may respond with a data packet on receipt of a regular request packet. When a participant receives a data packet over the network in response to a pending or previously sent request, the participant may switch to a piggyback 'mode'. In a piggyback mode, in response to a subsequent request or piggyback packet received by the participant, a piggyback packet may be sent in place of a regular data packet, if the participant has both content to send and a request for content from the far-end. If a data packet is received and the participant requires data, a request packet may be sent to the one or more other participants in the communications session. The response of a participant to the receipt of a piggyback packet, a request packet, or a data packet is additionally detailed in FIG. 7.

Figure 4A:
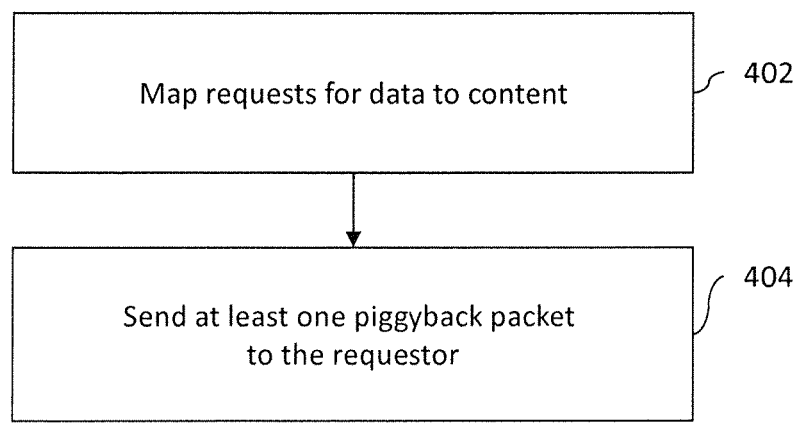
FIGS. 4a and 4b are flowcharts illustrating steps involved in a piggyback session, in accordance with an embodiment.
Figure 4B:
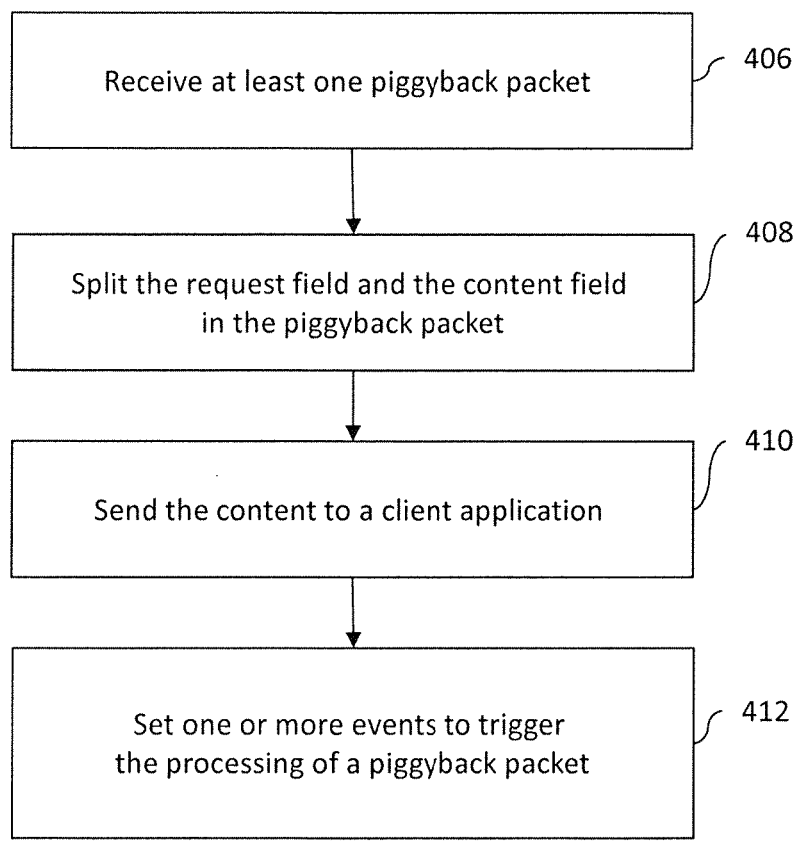

Referring now to FIGS. 4a and 4b, sending as well as processing piggyback packets involves one or more processing steps. More specifically, a participant in a piggyback mode may additionally comprise a timer and an event handler process, where the event handler process running at the participant may be configured to catch one or more events. Events defined may include an internal timeout event, a request for data from the client application, a request to send data by the client application, a request for data from another participant in the communications session, receipt of data from another participant and the receipt of a piggyback packet from another participant.

Specifically, as in the block 402 of FIG. 4a, if a request for content is received from a remote participant or a running client application, the request is first mapped to content to be sent. In a first instance, if the request originates from a remote participant and the requested content is available to be sent, then any extant requests for data required from the remote participant and the content to be sent are embedded in a piggyback packet and sent to the remote participant, as in 404. In some embodiments, if the mapping returns no content at the participant in response to the request from the far end and no corresponding request for data from the remote participant exists, the received request is buffered in a memory at the client device. If the content exists but there is no request for data from a remote participant, the content is also buffered.

In a second instance, if the request for content originates from a client application on the participant, then extant content that maps to a content request from a remote participant is embedded with the request for content in a piggyback packet, and sent to the remote participant, as in 404. If no such content exists, the request for content is buffered. Also, if there is no pending request for content from a remote participant, the request for content by the client application is buffered at the client device. In some embodiments, if there is content to be sent to a remote node and no content request from the client application is received, the content is buffered.

Referring now to FIG. 4b, on receiving a piggyback packet, as in 406, the piggyback packet received may be split into request data and content data, as in the subsequent block 408, and the content so obtained sent to the client application, as in 410. The event handler process may be defined by the step of setting one or more events, as in 412.

Figure 6:
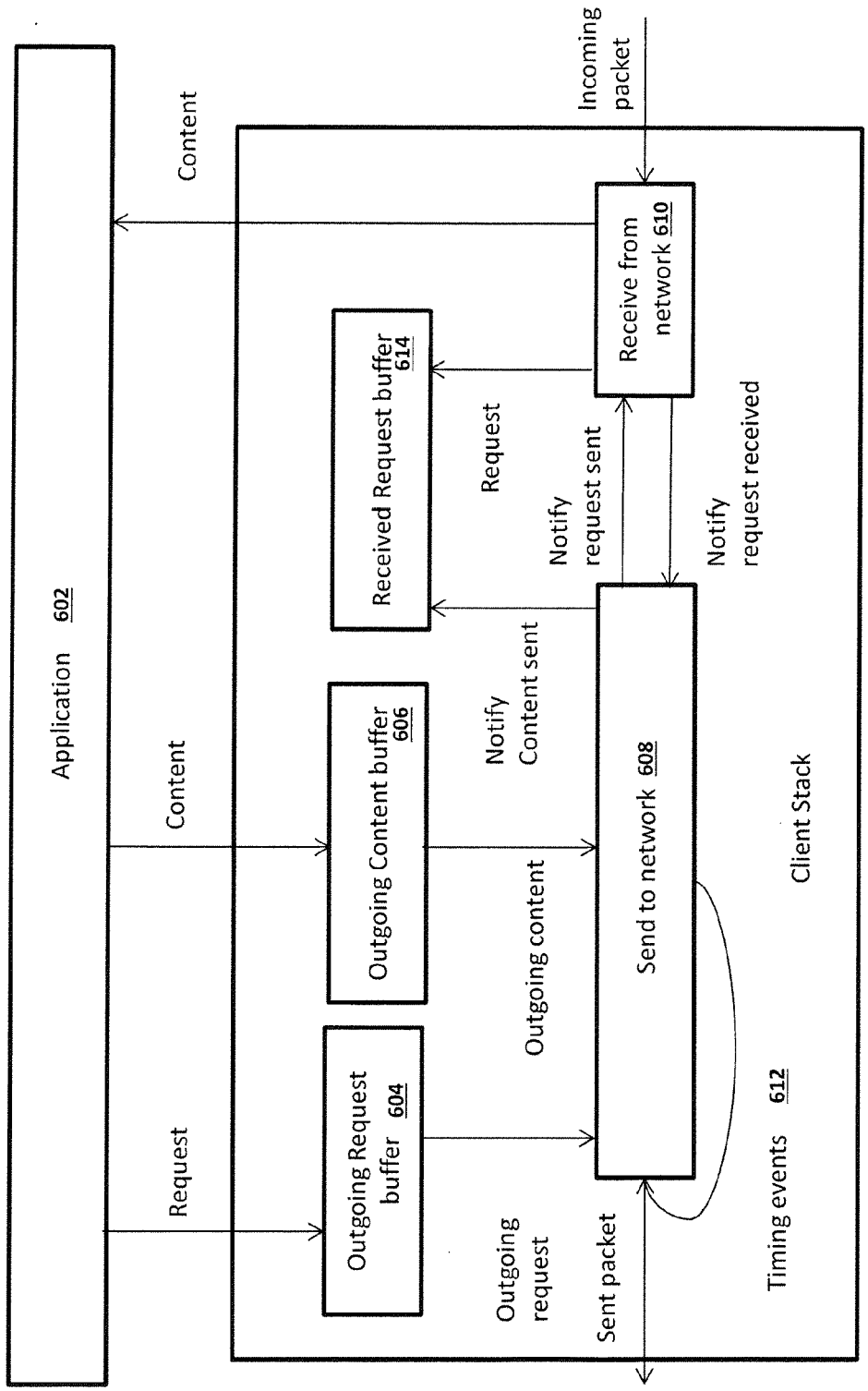
FIG. 6 is a schematic diagram of the processing of a piggyback packet at a client side device, in accordance with an embodiment.

A client stack at the participant whereby the initialization and processing of events in a piggyback session is performed, in accordance with some embodiments, is further detailed by means of FIG. 6. FIG. 6 illustrates the passage of content and requests between a client application 602 and a client stack hosting buffers for requests to be sent 604, requests received 614 and content to be sent 606. The buffers may be computer readable memory, for instance. Incoming packets from remote participant are received, their contents are transmitted to the application and requests queued for processing by a receiving module 610. Packets may be sent to a remote participant by means of a network send module, as in 608. Sent packets may include piggyback packets, in accordance with some embodiments. Timing events, as in 612, include an expiry time associated with a request packet or a data packet and a piggyback 'fallback' time.

More specifically, when the application 602 sends request and content to the client stack in a piggyback session, the application may specify a maximum time for which the request and content may be stored in the request or content buffers. The time specified, which is the expiry time associated with the request or content, may be smaller than the lifetime of the request or content. The piggyback fall-back time is selected as the minimum of the expiry time of a request and the content.

If a client stack receives both request and content from the application, as well as a request for content from a remote participant, a piggyback packet may be sent in response. In instances where these conditions do not exist, the two timing events may form the basis of decisions at the client stack. More specifically, if the client stack has stored content from the application 602 and has not received a request for content from the application, the piggyback fall-back time may be checked. If the fall-back time exceeds an expiry time associated with a received request from a remote participant, then the stored content may be sent as a normal data packet without waiting to create a piggyback packet with a request from the application 602.

In another instance, the client stack may have received a request from the application 602 but not yet received either or both of content to send and a request for content from a remote participant. If so, no action may be taken until the piggyback fall-back time. If, by that time, both the remote request and content are received, a piggyback packet may be created and transmitted. If not, only a request packet may be sent to the remote participant.

Figure 5:
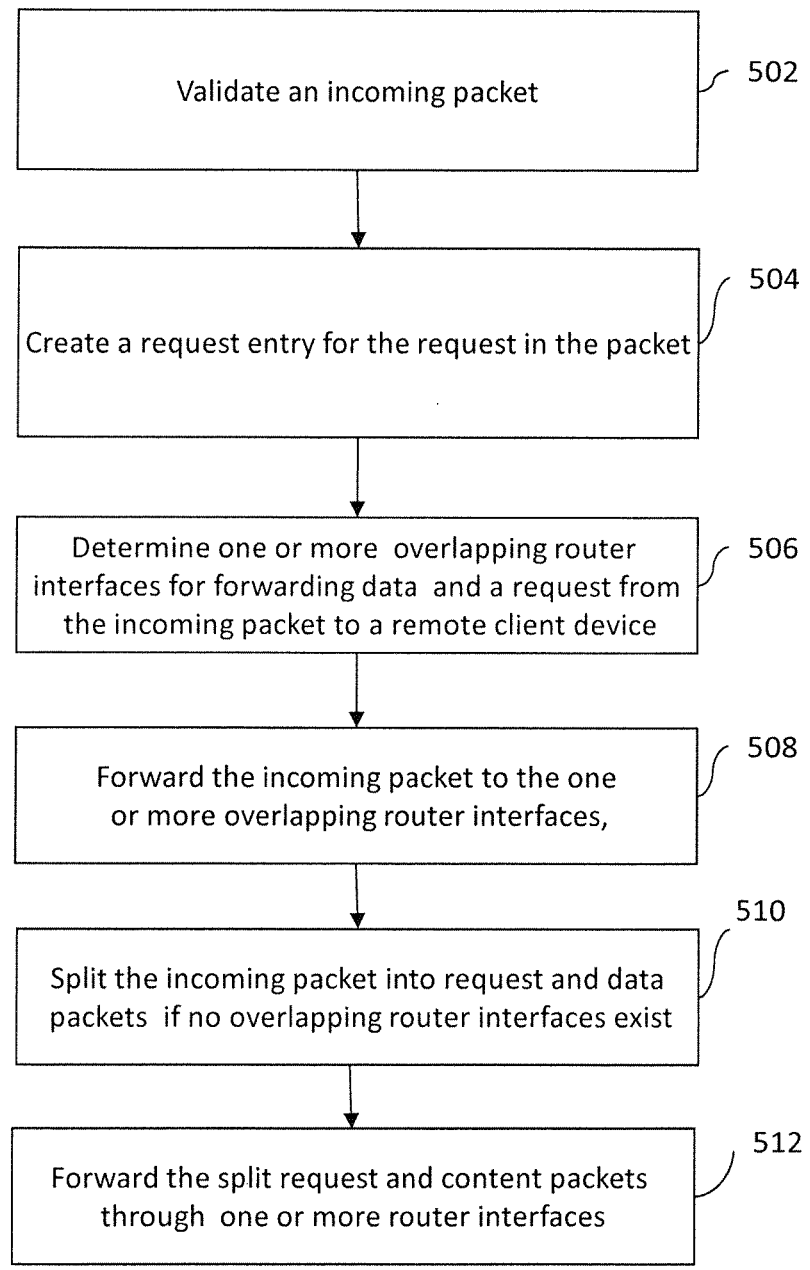
FIG. 5 is a flowchart illustrating the optimization of bi-directional communications at a router device, in accordance with an embodiment.

Aspects of the present invention including processing steps at a router device in order to enable the transfer of piggyback packets across a network. Referring now to FIG. 5, an initial step in the optimization of bi-directional communications at a router device is the validation of incoming packets, as in 502. Validation may include checking the validity of the piggyback packet as well as verifying its authenticity. Validity of the packet is done by verifying if the packet structure complies with that of a piggyback packet as depicted in FIG. 2. Authenticity of the source from which the packet is received is done by checking the authentication field in the packet. Additionally, on receiving a piggyback packet, the router device may confirm that the packet is not a duplicate of a previously received packet. The purpose of such verification may be to forestall flooding of the network with duplicate packets by a malicious router node, for instance. The validation may be performed on the basis of a comparison of the authentication field in the piggyback packet with the authentication fields of received packets. In some preferred embodiments, a nonce field containing a unique nonce may be embedded in the authentication field prior to dissemination by the sender. If a duplicate is detected, the packet is dropped. If the received packet is not a duplicate, prefix based matching of the piggyback name, that is, the content name as in 206 of FIG. 2, is performed with all pending requests in the router device. The pending requests may be stored in a memory at the router device. If no pending requests match the incoming piggyback packet, the incoming packet is dropped.

If more than one pending request matches, only the closest match is considered. Then, as in 504, a request entry is created at the router for the request embedded in the piggyback packet. Then, as in 506, one or more overlapping router interfaces for forwarding the data and request in the piggyback packet to a remote client device are determined. This is done by first, checking the request entry corresponding to the content field in the piggyback packet to get the list of interfaces through which the content can be forwarded towards the remote participant and then matching the request name with the entries in the router's forwarding table to deduce the interfaces through which the request can be forwarded. Overlapping interfaces refer to the list of interfaces that are common in both the list associated with content forwarding and that associated with forwarding the request. One or more of these overlapping interfaces can be selected to forward the piggyback packet towards the remote participant as in 508. If there are no overlapping interfaces, then the content field of the piggyback packet may be separated from the request field as in 510 and forwarded through the closest matching interface, as in 512. In some embodiments, the separated request field may additionally be reconstituted as a request packet and forwarded through an interface which is the closest estimated match. If there are no valid interfaces through which the request may be forwarded, it may be discarded.

Embodiments of the invention may incorporate mechanisms for handling packet drop in the network. In a communications session, a packet drop may be caused by any of a variety of reasons, including, for example, loss of network connectivity, malicious router nodes, and congestion. A piggyback session may handle packet drop instances by implementing an associated 'timeout' with request packets transmitted in the session. Since communications may be conducted in real-time, the timeout specified in a piggyback sessions may be small enough to recover lost data before the data turns stale. Some embodiments may incorporate methods to handle such timeouts by switching out of the piggyback session and reverting to sending and receiving normal request and data packets. Other embodiments may incorporate mechanisms that detect when the network conditions improve and automatically switch back the piggyback session, thus re-starting piggyback packet exchanges.

Some embodiments may incorporate pipelining in a piggyback session. Pipelines may be implemented by buffering incoming packets into a processor readable memory at each participant. Before the participant enters a piggyback session with a remote participant, a number of request packets equal to a desired pipeline size may be sent thereto. Subsequently, the participant may then receive a number of piggyback packets equal to the number of request packets transmitted. If the participant then receives a request packet in the piggyback session, the number and size of un-serviced pending requests is checked. If the pending requests match the size of the pipeline, the participant may respond with a regular data packet in lieu of a piggyback packet otherwise. If a data packet is received in the piggyback session, the pending interests and pipeline are similarly checked. If the pipeline size has been exceeded, no response may be sent. Otherwise, the participant may reply to the data packet with a regular request packet.

The present description includes the best presently-contemplated method for carrying out the present invention. Various modifications to the embodiment will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those of ordinary skill in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

What is claimed is:

1. A computer implemented method for enhanced bi-directional communication an information centric computer network, the method comprising:

receiving, by a computing apparatus, one or more requests for data from at least one of a remote node or a client application on the computing apparatus; and switching to a piggyback session by the computing apparatus, wherein a piggyback session comprises:

mapping the one or more requests for data received to content;

sending at least one piggyback packet, by the computing apparatus, to the remote node, wherein a piggyback packet is a data packet comprising a request field and a content field, further wherein the request field comprises a request for data;

receiving at least one piggyback packet from the remote node;

splitting the request field and the content field in the at least one received piggyback packet;

sending the content extracted from the received piggyback packet to a client application running on the computing apparatus; and setting one or more events to trigger processing of at least one piggyback packet.

2. The computer implemented method as claimed in claim 1, further comprising setting one or more timers to trigger time-bound processing of pending requests and content from the application and the remote node.

3. A computer implemented method for enhanced bi-directional communication an information centric computer network, the method comprising:

receiving, by a computing apparatus, one or more requests for data from at least one of a remote node or a client application on the computing apparatus;

switching to a piggyback session by the computing apparatus, wherein a piggyback session comprises:

mapping the one or more requests for data received to content;

sending at least one piggyback packet, by the computing apparatus, to the remote node, wherein a piggyback packet is a data packet comprising a request field and a content field;

receiving at least one piggyback packet from the remote node;

splitting the request field and the content field in the at least one received piggyback packet;

sending the content extracted from the received piggyback packet to the client application running on the computing apparatus; and setting one or more events to trigger processing of at least one piggyback packet;

setting one or more timers to trigger time-bound processing of pending requests and content from the client application and the remote node; and starting a fallback timer and an event handler process by the computing apparatus, wherein the event handler process is configured to catch an expiry event associated with the fallback timer.

4. The computer implemented method as claimed in claim 3, further comprising processing one or more buffered requests and content and sending the one or more buffered requests and content to the remote node.

5. The computer implemented method as claimed in claim 1, further comprising listening, by an event handler process on the computing apparatus, for a request for data by the client application.

6. The computer implemented method as claimed in claim 5, further comprising buffering at least one request received by the computing apparatus from the client application.

7. The computer implemented method as claimed in claim 1, further comprising listening, by an event handler process on the computing apparatus, for a content send request by the client application.

8. The computer implemented method as claimed in claim 7, further comprising buffering content received by the computing apparatus from the client application.

9. The computer implemented method as claimed in claim 1, further comprising listening, by an event handler process on the computing apparatus, for a request for data from a remote node.

10. The computer implemented method as claimed in claim 9, further comprising buffering at least one request received by the computing apparatus from the remote node.

11. The computer implemented method as claimed in claim 3, further comprising:

listening, by the event handler process on the computing apparatus, for a request for data by the client application; and retrieving content from a buffer on registering a request for content from the client application by the event handler process, and sending at least one piggyback packet to at least one target remote node.

12. The computer implemented method as claimed in claim 3, further comprising:

listening, by the event handler process on the computing apparatus, for a content send request by the client application; and retrieving a request from a buffer on registering a content send request from the client application by the event handler process, and sending at least one piggyback packet to at least one target remote node.

13. The computer implemented method as claimed in claim 1, further comprising monitoring a packet traffic pattern associated with the piggyback session.

14. The computer implemented method as claimed in claim 1, further comprising terminating the piggyback session if a network latency associated with the computer network exceeds a predefined threshold.

15. The computer implemented method as claimed in claim 3, further comprising:

terminating the piggyback session if a network latency associated with the computer network exceeds a predefined threshold; and reverting to piggyback packet based data exchange if the network latency drops below the predefined threshold.

16. The computer implemented method as claimed in claim 1, further comprising initiating a piggyback session on receiving a piggyback packet.

17. The computer implemented method as claimed in claim 1, wherein processing further comprises sending at least one piggyback packet to at least one remote node in response to a request received from the at least one remote node.

18. A computer implemented method for enhancing bi-directional communication by a router device in an information centric network, the method comprising:

validating an incoming packet by the router device, wherein the incoming packet comprises a content field and a request field, further wherein the request field comprises a request for data;

checking a processor readable memory at the router device for a stored request entry that matches content in the incoming packet;

creating an entry in a processor readable memory at the router device for the request for data in the incoming packet;

determining one or more router interfaces for forwarding content from the incoming packet to a remote client device;

determining one or more router interfaces for forwarding the request for data from the incoming packet to a remote client device; and forwarding the incoming packet to one or more overlapping router interfaces, wherein an overlapping router interface is a determined router interface for forwarding the content from the incoming packet and is a determined router interface for forwarding the request for data from the incoming packet; and splitting the incoming packet into a request packet and a data packet if no overlapping router interfaces exist.

19. The computer implemented method as claimed in claim 18, further comprising forwarding the data packet and the request packet extracted from the incoming packet to their corresponding determined router interface.

20. A non-transitory computer readable storage medium having stored thereon computer executable instructions for performing a method for enhanced bi-directional communication in an information centric computer network, the method comprising:

receiving one or more requests for data from at least one of a remote node or a client application; and switching to a piggyback session, wherein a piggyback session comprises:

mapping the one or more requests for data received to content;

sending at least one piggyback packet to the remote node, wherein a piggyback packet is a data packet comprising a request field and a content field, further wherein the request field comprises a request;

receiving at least one piggyback packet from the remote node;

splitting the request field and the content field in the at least one received piggyback packet;

sending the content extracted from the received piggyback packet to a client application;

setting one or more events to trigger the processing of at least one piggyback packet; and setting one or more timers to trigger time-bound processing of one or more requests and content from the client application and or the remote node.

21. The method as claimed in claim 20, further comprising listening, by an event handler process on the computing apparatus, for a request for data by the client application.

22. The method as claimed in claim 21, further comprising buffering at least one request received by the computing apparatus from the client application.

23. The method as claimed in claim 20, further comprising listening, by an event handler process on the computing apparatus, for a content send request by the client application.

24. The method as claimed in claim 23, further comprising buffering content associated with the client application.

25. The method as claimed in claim 20, further comprising listening, by an event handler process on the computing apparatus, for a request for data from a remote node.

26. The method as claimed in claim 25, further comprising buffering at least one request received by the computing apparatus from the remote node.

27. The method as claimed in claim 20, further comprising starting a fallback timer and an event handler process by the computing apparatus, wherein the event handler process is configured to catch an expiry event associated with the fallback timer.

28. One or more non-transitory computer readable storage media having stored thereon computer executable instructions for performing a method for enhanced bi-directional communication in an information centric computer network, the method comprising:

receiving one or more requests for data from at least one of a remote node or a client application; and switching to a piggyback session, wherein a piggyback session comprises:

mapping the one or more requests for data received to content;

sending at least one piggyback packet to the remote node, wherein a piggyback packet is a data packet comprising a request field and a content field;

receiving at least one piggyback packet from the remote node;

splitting the request field and the content field in the at least one received piggyback packet;

sending the content extracted from the received piggyback packet to the client application;

setting one or more events to trigger processing of at least one piggyback packet; and setting one or more timers to trigger time-bound processing of one or more requests and content from the client application and the remote node;

starting a fallback timer and an event handler process by the computing apparatus, wherein the event handler process is configured to catch an expiry event associated with the fallback timer; and processing one or more buffered requests and content and sending the one or more buffered requests and content to the remote node.

29. The method as claimed in claim 20, further comprising monitoring a packet traffic pattern associated with the piggyback session.

30. The method as claimed in claim 20, further comprising terminating the piggyback session if a network latency associated with the computer network exceeds a predefined threshold.

31. The one or more non-transitory computer readable storage media of claim 28, wherein the method further comprises:

terminating the piggyback session if a network latency associated with the computer network exceeds a predefined threshold; and reverting to piggyback packet based data exchange if the network latency drops below the predefined threshold.

32. The method as claimed in claim 20, further comprising initiating a piggyback session on receiving a piggyback packet.

33. The method as claimed in claim 20, wherein processing further comprises sending at least one piggyback packet to at least one remote node in response to a request received from the at least one remote node.

34. The one or more non-transitory computer readable storage media of claim 28, wherein the method further comprises:

listening, by the event handler process on the computing apparatus, for a content send request by the client application; and retrieving a request from a buffer on registering a content send request from the client application by the event handler process, and sending at least one piggyback packet to at least one target remote node.

35. The one or more non-transitory computer readable storage media of claim 28, wherein the method further comprises:

listening, by the event handler process on the computing apparatus, for a request for data by the client application; and retrieving content from a buffer on registering a request for content from the client application by the event handler process, and sending at least one piggyback packet to at least one target remote node.

* * * * *